United States Patent [19]

Dunkerley et al.

[11] 4,071,381

[45] Jan. 31, 1978

[54] STEEL ABRASIVE MATERIALS

[75] Inventors: Fred J. Dunkerley, Broomall, Pa.; Albert J. Gaudino, Parma; Robert P. Vilyus, Solon, both of Ohio

[73] Assignee: Cleveland Metal Abrasive, Inc., Cleveland, Ohio

[21] Appl. No.: 720,596

[22] Filed: Sept. 7, 1976

[51] Int. Cl.$^2$ ............................................. C04B 35/70
[52] U.S. Cl. ................................... 148/36; 75/123 L; 148/134
[58] Field of Search ................ 148/134, 138, 142, 36, 148/3; 75/.5 BA, .5 C, 123 R, 123 N, 123 L

[56] References Cited

U.S. PATENT DOCUMENTS

| | | | |
|---|---|---|---|
| 2,863,790 | 12/1958 | Chen | 148/3 |
| 3,245,840 | 4/1966 | Libman | 148/3 |
| 3,649,370 | 3/1972 | Dorn et al. | 148/3 |

OTHER PUBLICATIONS

Mehl, R; *Metals Handbook*, vol. 7: Microstructures, Metals Park, Ohio (ASM) 1972 p. 46.

*Primary Examiner*—Walter R. Satterfield
*Attorney, Agent, or Firm*—John H. Mulholland

[57] ABSTRACT

Disclosed is a refined and alloyed martensite-free cast steel abrasive material and method of making the same. The abrasive material is either shot or grit and has a composition which includes carbon in about the range of 0.60 to 1.20 percent by weight, silicon in about the range of from 0.30 to 1.50 percent by weight, sulphur in about the range of from 0.0 to 0.1 percent by weight with the remainder substantially all iron, trace elements and impurities. The substantially martensite-free microstructure is characterized by the presence of one or more of the group consisting of lower bainite, upper bainite, pearlite or ferrite and mixtures thereof, thus providing a more ductile abrasive particle of improved wear resistance.

12 Claims, No Drawings

STEEL ABRASIVE MATERIALS

BACKGROUND OF THE INVENTION

The manufacture of cast steel abrasive material, shot and grit, heretofore has been basically standard within the metal abrasives industry and cast steel shot and grit is sold subject to either the Society of Automotive Engineers (SAE) standards or the Steel Founders Society of America (SFSA) standards. The SFSA specification for cast steel abrasives carries the designation 20T-66 and is widely used. It sets forth technical requirements, particularly with regard to chemistry, microstructure, appearance and hardness. The process of manufacturing typically includes steps of: charging, melting, refining and pouring, with the pouring step being accomplished by directing the melted and refined molten steel through a stream of water under pressure and into a water quenching bath. The as-cast shot then, after being dried, is taken to a hardening furnace which is typically a continuously rotating retort having a series of gas burners controlling its temperature. After going into a quenching pit from the hardening furnace and again going through a drying operation, the hardened shot is subjected to a tempering operation to make tempered martensitic shot. The tempered martensitic shot ends up with a hardness on the Rc Scale of from 40 to 50. The hardened shot is crushed if grit is desired. Where softer shot was desired, a relatively long and expensive annealing operation was performed on as-cast shot. See, for example, U.S. Pat. No. 3,649,370 to Dorn et al.

The instant invention has been accomplished by consideration of the role which microstructure plays in the quality of steel shot and grit. Heretofore, tempered martensite has been accepted by the industry as the best microstructure and has been required by the above-mentioned standards.

The instant invention provides steel abrasive particles of improved breakdown life quality by selectively alternating the microstructure of the steel. It is known that in steel the micro-constituents pearlite, lower bainite, upper bainite and ferrite are softer and more ductile than either tempered or untempered martensite and have better abrasion resistance. Accordingly, the instant invention resulted from a refusal to accept martensite as the optimum of microstructure. The invention provides a microstructure which gives the steel particle better cleaning ability and prolonged useful life before the particle breaks down under a given set of use conditions.

It has been found that a particle of the more ductile constituents of upper bainite, lower bainite, pearlite or ferrite, when abraded repeatedly in the cleaning operation, undergoes slightly more deformation than a particle of tempered martensite. This is because the ductile particles tend to distribute impact and wear stresses more than the less ductile tempered martensite particles. It is believed that this behavior retards failure of the shot by reference since the actual stress levels are lower due to the distribution of wear forces over greater areas. Further, although wear stress levels of comparable ductile particles will be slightly lower than in tempered martensite, cleaning ability of the more ductile microstructures is comparable to or better than that of tempered martensite because the average particle size of the work mix of these softer microstructures will be larger than the average size of a comparable work mix of tempered martensite particles.

Moreover, the greater particle deflection results in slightly greater contact area between the shot cleaning media and the workpiece and this improves the area of effective cleaning of the particle. It has been found that shot and grit manufactured according to the instant invention and having the microstructure claimed provides an abrasive material which will clean as well as that subject to the current standards and will have a longer life. An important aspect of the invention is a new heat treating process for steel particles which permits production of upper bainite, lower bainite, pearlite and ferrite microstructures in the abrasive material to give it higher wear resistance and ductility.

BRIEF DESCRIPTION OF THE INVENTION

The invention involves a method of producing improved cast steel abrasive material having a substantially martensite-free microstructure. Steel particles are heated to a temperature above 1350° F. and maintained there for a sufficient time to substantially completely austenitize the steel. The fully austenitized steel is then cooled to a temperature between 500° F. and 1300° F. and maintained there until the austenitized steel is transformed into a martensite-free microstructure of either upper bainite, lower bainite, pearlite, ferrite or a mixture of two or more of these micro-constituents.

The resulting steel abrasive material typically has a hardness of 20 to 47 on the Rockwell C (Rc) Scale.

DETAILED DESCRIPTION OF THE INVENTION

The novel steel abrasives material of the invention and its method of production will be particularly described with regard to the production of steel shot having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities. As heretofore indicated, the austenization and transformation process described can also be utilized in the production of steel grit having all of the described advantages of the invention. The objective in obtaining shot and grit products containing these various controlled micro-constituents is to produce a family of products in the micro-hardness range Rc 30 to 47 which will yield a superior breakdown life. Commercially standard shot basically can be described as having 95 percent tempered martensite and a micro-hardness of Rc 40 to 50.

It has been found that an analogy can be made from published isothermal transformation diagrams such as found in *Atlas of Isothermal Transformation Diagrams,* Second Edition, page 36, United States Steel Co., Pittsburgh, Pa., Copyright 1951, for SAE 1095 steel, and diagrams for the steel utilized in the instant invention. The curves indicate that after a full austenitizing soak at 1350° F. or above, then 1. If quenched into a furnace (with air atmosphere or other more suitable heat transfer media) at 1200° F., for a minimum of 1 minute, a fully pearilitic plus small amounts of ferrite and residual carbide microstructure will result or;

2. If quenched from 1350° F. or above into a furnace (with air atmosphere or other more suitable heat transfer media) at 800° F. ideally within 1 sec. and then held (at 800° F.) for one minute or more, a microstructure predominantly upper bainite with minimum amounts of pearlite, ferrite and residual carbide will result; or 3. If quenched from 1350° F. or above to below 1000° F. ideally within 1 sec. and into a furnace (with air atmosphere or more suitable heat transfer media) at 500° F. with more than 200 sec. lapsed time from below 1000° F., to 500° F. followed by holding at 500° F. for about 30–45 minutes, a microstructure predominantly lower bainite with minimum amounts of pearlite, ferrite, upper bainite and residual carbide will result.

Using this information as a guideline, experiments were performed with the results shown in Table I. The experiments conducted were for a transformation process on material of a size that would go through a 14 and be held on a 16 mesh standard screen.

In the left major section of Table I is the specification of the various austenitizing steps of the procedure. The temperature in degrees Fahrenheit are indicated and as will be seen, all austenitization processes were taken at a temperature above 1600°. This was done to insure that complete austenization was accomplished in a relatively short time. The second sub-column under the austenitizing process section of Table I indicates the time for which these particles were held at that temperature in minutes. Reduction of temperature in the direction of 1350° F. would increase the "soak" time required for full austenization.

The next major section of Table I is the transformation procedure of the austenitized particles. The left sub-column of the transformation section is the furnace temperature in degrees of Fahrenheit and the right sub-column under that transformation section in time in minutes. Because of the relatively small size of the particles, it is felt that the furnace temperature is a reasonably accurate measurement of the temperature achieved by the particles.

The next major section of the transformation process of Table I is the hardness average in Rockwell C (Rc). It is well known in the shot industry any given heat of shot will for its various particles have slightly differing hardnesses, and accordingly, the most accurate indication of hardness available is an average of the hardnesses of several particles from that heat. This is what is indicated in this section of Table I.

In the microstructure section of Table I, the microconstituents are each provided with a column. It will be seen that none of the samples resulted in martensite and two samples contained significant amounts of lower bainite (LB), five samples has significant amounts of upper bainite (UB), six samples had significant amounts of pearlite (P) and seven samples had significant amounts of ferrite (Fe). Of course, all of the samples probably included an insignificant amount of residual carbide.

The last section of Table I illustrates the test results where the breakdown life in number of cycles of the samples were compared at points where theoretically 100% of the shot had been replaced. This testing method is performed as follows: begin with 100gm. sample of selected size abrasive product; (in this case, that which would go through a 14 and held on a 16 mesh screen); this material is then cycled for 500 cycles in an Ervin breakdown machine manufactured by Ervin Industries, Ann Arbor, Michigan; the product retained on a 40 cut-off screen is then measured by weighing; new abrasive product to bring the remaining abrasive material back to a 100gm. sample is then added to the machine and the material cycled for another 500 cycles; again the abrasive product retained on a 40 cut-off screen is determined and enough material is added to return the sample weight to 100gms.; these steps are repeated until a total replacement weight of the product in the test exceeds 100gms., that is the total product necessitated to be replaced will exceed 100gms.; then an interpolation between the number of cycles required to completely degrade the 100gms. of product retained on the 40 cut-off screen is accomplished to obtain the total number of cycles for the complete degredation.

TABLE I

Transformation Process
Size: Through a 14, Held On a 16 Mesh Standard Screen

| No. | Austenitizing Temp. ° F. | Time Min. | Transformation Furnace Temp ° F. | Time Min. | Hardness Ave. Rc | Microstructure In Per Cent | | | | | 100% Replacement Breakdown Life # of Cycles |
|---|---|---|---|---|---|---|---|---|---|---|---|
| | | | | | | Martensite | LB | UB | P | Fe | |
| 1 | 1650 | 5 | 800 | 10 | 41.8 | — | — | 65 | 25 | 70 | 2865 |
| 2 | 1650 | 5 | 600 | 20 | 41.6 | — | 10 | 50 | 35 | 5 | 2884 |
| 3 | 1650 | 5 | 800 | 5 | 41.1 | — | — | 75 | 20 | 5 | 2808 |
| 4 | 1650 | 15 | 800 | 10 | 38.5 | — | — | 80 | 15 | 5 | 2964 |
| 5 | 1650 | 5 | 500 | 15 | 36.1 | — | 70 | 25 | — | 5 | 2873 |
| 6 | 1650 | 5 | 1200 | 5 | 31.1 | — | — | — | 95 | 5 | 2818 |
| 7 | 1650 | 15 | 1200 | 10 | 28.0 | — | — | — | 95 | 5 | 2678 |

For comparative purposes three typical tests of the heat treated shot of Table I was submitted to the breakdown study as shown in the column labeled "100% Replacement Breakdown Life, No. of Cycles". It was then compared to fully tempered as-cast steel shot of the same size having a hardness of Rc 43 to 45 and characterized by a tempered martensite microstructure. The 100% replacement breakdown life of the as-cast tempered shot was 2450 cycles.

Table II illustrates breakdown life of SAE and SFSA conventional tempered martensitic shot having average hardnesses of various quantities on the Rockwell C (Rc) Scale.

TABLE II

Breakdown Life of Conventional Tempered Martensitic Shot
(SAE and SFSA; through a 14, held on a 16 mesh standard screen)

| No. | Hardness Ave. Rc | 100% Replacement Breakdown Life #of Cycles |
|---|---|---|
| 1. | 46.8 | 2449 |
| 2. | 45.8 | 2451 |
| 3. | 44.7 | 2378 |
| 4. | 40.4 | 2161 |
| 5. | 31.9 | 2390 |
| 6. | 26.7 | 2409 |

Thus, it will be seen that when the variously heat treated shot was submitted to the "100% Replacement Breakdown Life Study", the more ductile microstructure obtained through this novel transformation process resulted in shot of significantly improved results. It is not intended that the terminology utilized in the claims be limiting. For example, the word "significant" should be interpreted as "important to a metallurgist" and identifiable by normal metallurgical laboratory microstructure analysis procedures. It should also be recognized that residual carbides are often found in these laboratory analyses and the claims as defined do not mean to exclude the "insignificant" presence of unnamed microconstituents.

What is claimed is:

1. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight; with the remainder substantially all iron and trace elements and impurities, the improvement which comprises a substantially martensite-free microstructure, the improved material being characterized by a hardness in about the range of 20 to 47 on the Rockwell C scale and an increase in breakdown life.

2. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities, the improvement which comprises a substantially martensite-free microstructure of substantially all lower bainite, the improved material being characterized by a hardness in about the range of 20 to 47 on the Rockwell C scale and an increase in breakdown life.

3. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities, the improvement which comprises a substantially martensite-free microstructure of substantially all upper bainite, the improved material being characterized by a hardness in about the range of 20 to 47 on the Rockwell C scale and an increase in breakdown life.

4. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight with the remainder substantially all iron and trace elements and impurities, the improvement which comprises a substantially martensite-free microstructure of substantially all pearlite, the improved material being characterized by a hardness in about the range of 20 to 47 on the Rockwell C scale and an increase in breakdown life.

5. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities, the improvement comprises a substantially martensite-free microstructure which includes a significant amount of ferrite, the improved material being characterized by a hardness in about the range of 20 to 47 on the Rockwell C scale and an increase in breakdown life.

6. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities, the improvement comprises a substantially martensite-free microstructure which includes a significant amount of lower bainite, the improved material being characterized by a hardness in about the range of 20 to 47 on the Rockwell C scale and an increase in the breakdown life.

7. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight with the remainder substantially all iron and trace elements and impurities, the improvement which comprises a substantially martensite-free microstructure which includes a significant amount of upper bainite, the improved material being characterized by a hardness in about the range of 20 to 47 on the Rockwell C scale and an increase in breakdown life.

8. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities, the improvement which comprises a substantially martensite-free microstructure which includes a significant amount of pearlite, the improved material being characterized by a hardness in about the range of 20 to 47 on the Rockwell C scale and an increase in breakdown life.

9. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities, the improvement which comprises a substantially martensite-free microstructure which includes a significant amount of upper bainite and lower bainite, the improved material being characterized by a hardness in about the range of 20 to 47 on the Rockwell C scale and an increase in breakdown life.

10. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight with the remainder substantially all iron and trace elements and impurities, the improvement which comprises a substantially martensite-free microstructure which includes a significant amount of pearlite and ferrite, the improved material being characterized by a hardness in about the range of 20 to 47 on the Rockwell C scale and an increase in breakdown life.

11. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight; sulphur in about the range of from 0.0 to 0.1 percent by weight with the remainder substantially all iron and trace elements and impurities, the improvement which comprises a substantially martensite-free microstructure which includes a significant amount of upper bainite, pearlite and ferrite, the improved material being characterized by a hardness in about the range of 20 to 47 on the Rockwell C scale and an increase in breakdown life.

12. In a refined and alloyed steel abrasive material having a composition which includes carbon in about the range of from 0.60 to 1.20 percent by weight; manganese in about the range of from 0.10 to 2.26 percent by weight; silicon in about the range of from 0.30 to 1.50 percent by weight sulphur in about the range of from 0.0 to 0.1 percent by weight with the remainder substantially all iron and trace elements and impurities, the improvement which comprises a substantially martensite-free microstructure which includes a significant amount of lower bainite, upper bainite, pearlite and ferrite, the improved material being characterized by a hardness in about the range of 20 to 47 on the Rockwell C scale and an increase in breakdown life.

* * * * *